(No Model.) 4 Sheets—Sheet 3.
T. E. NININGER.
WRAPPING MACHINE.
No. 594,273. Patented Nov. 23, 1897.
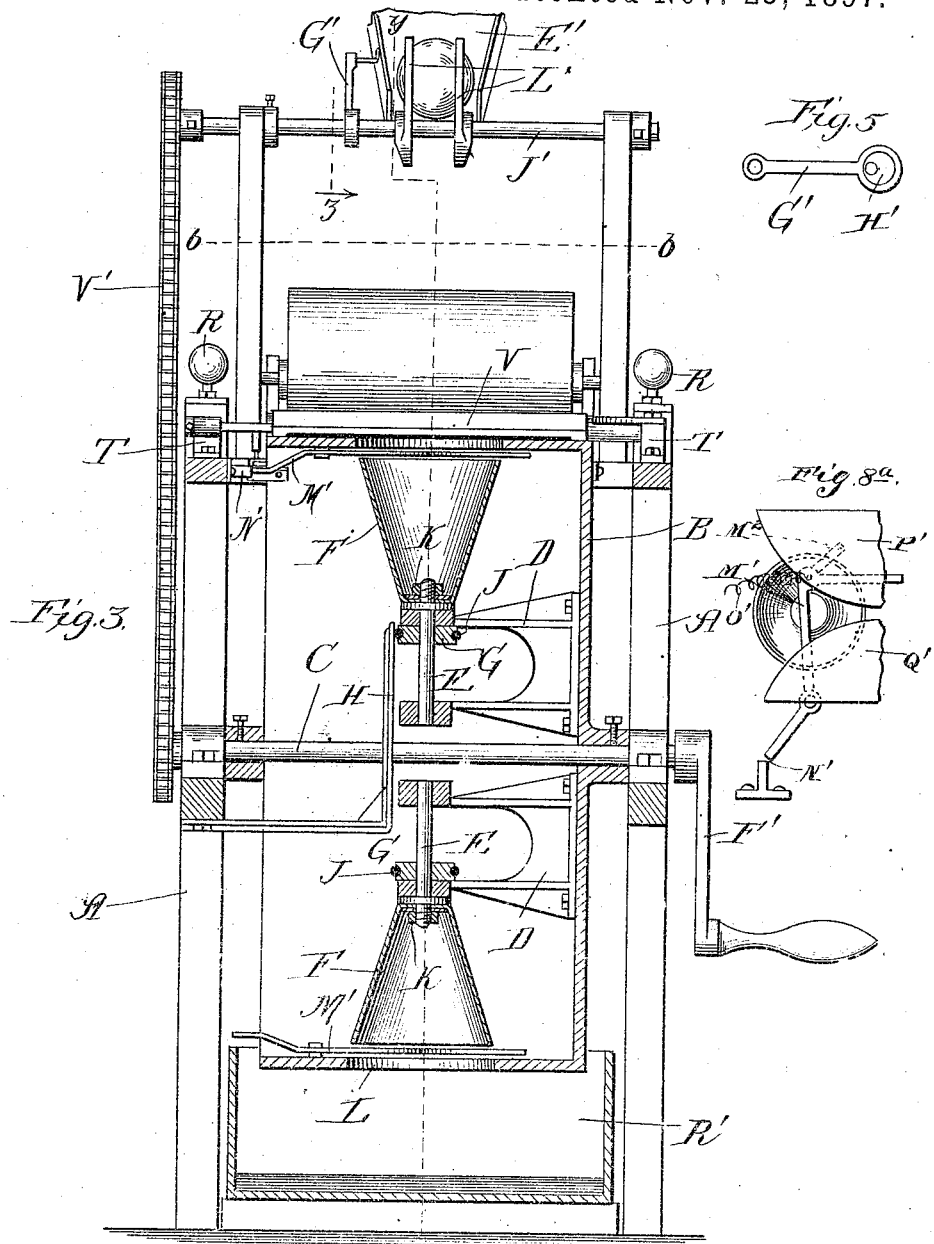
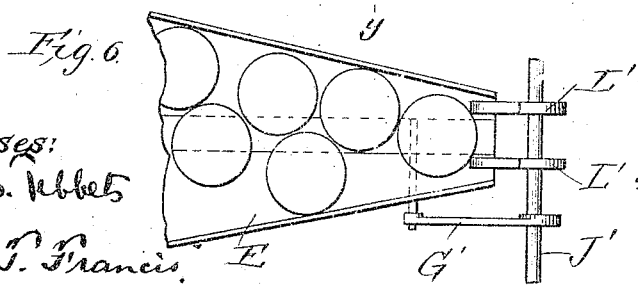
Witnesses:
John S. Tebbets
George T. Francis.
Inventor:
Thomas E. Nininger
By Mason & Darby
Attys

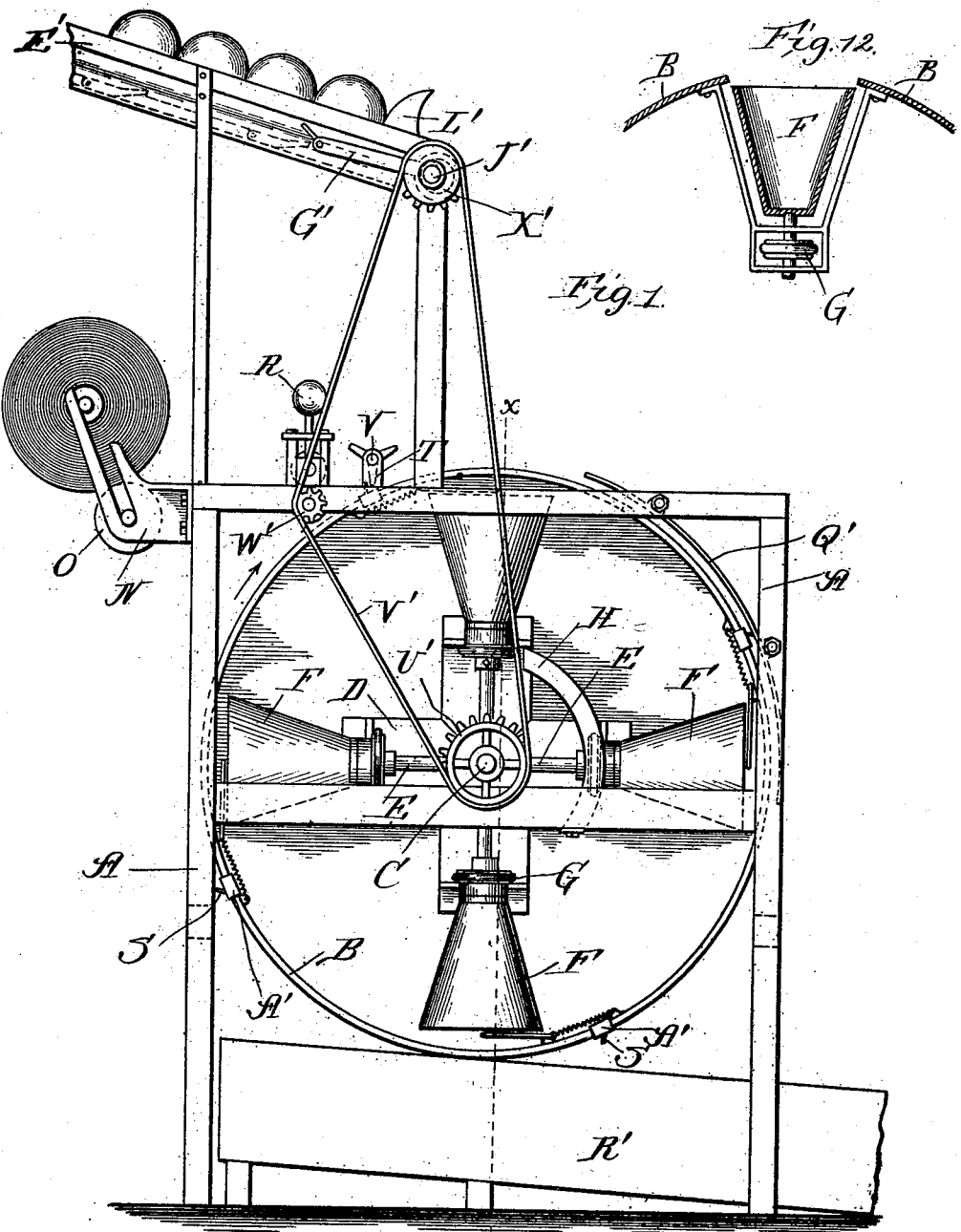

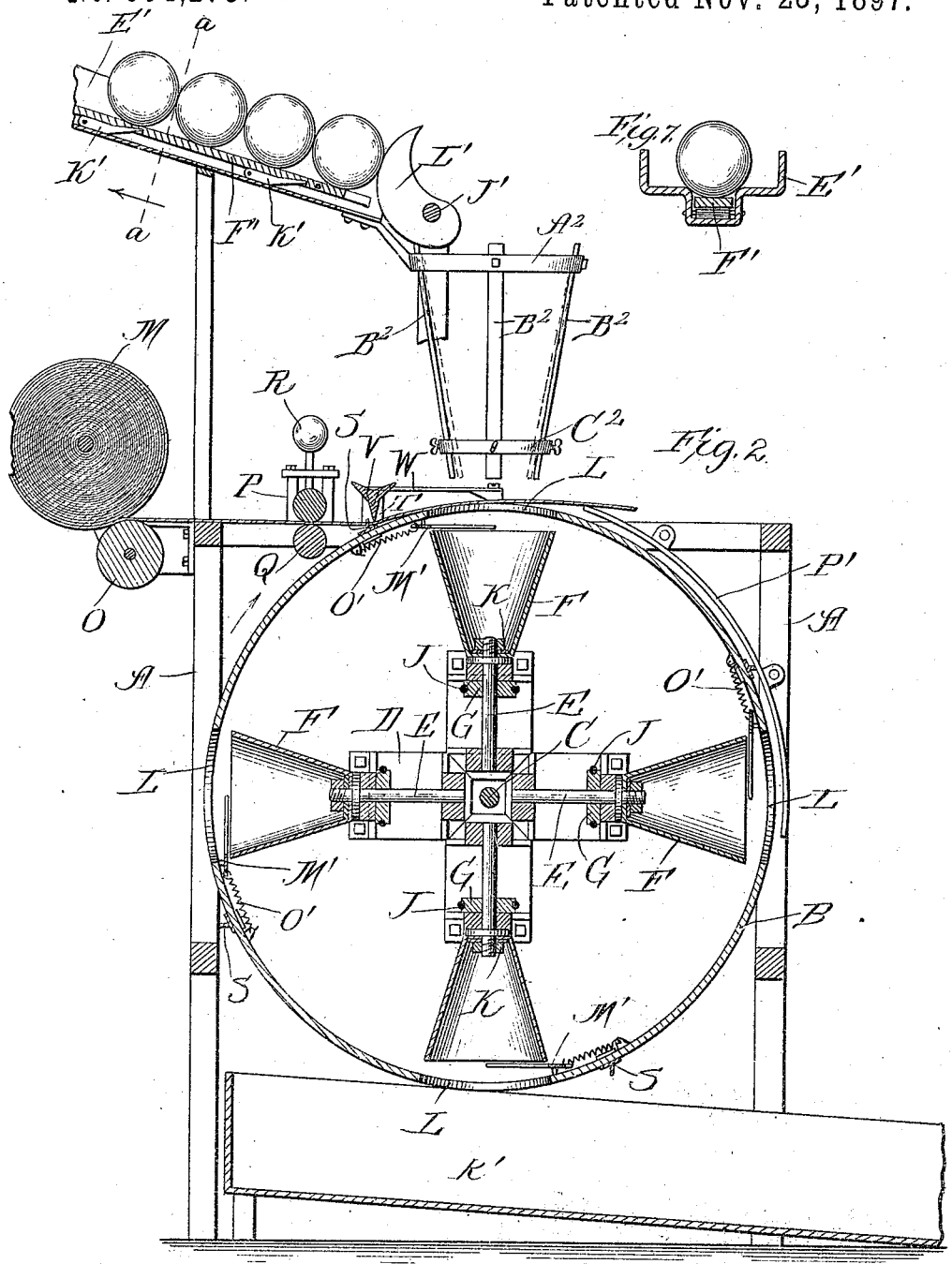

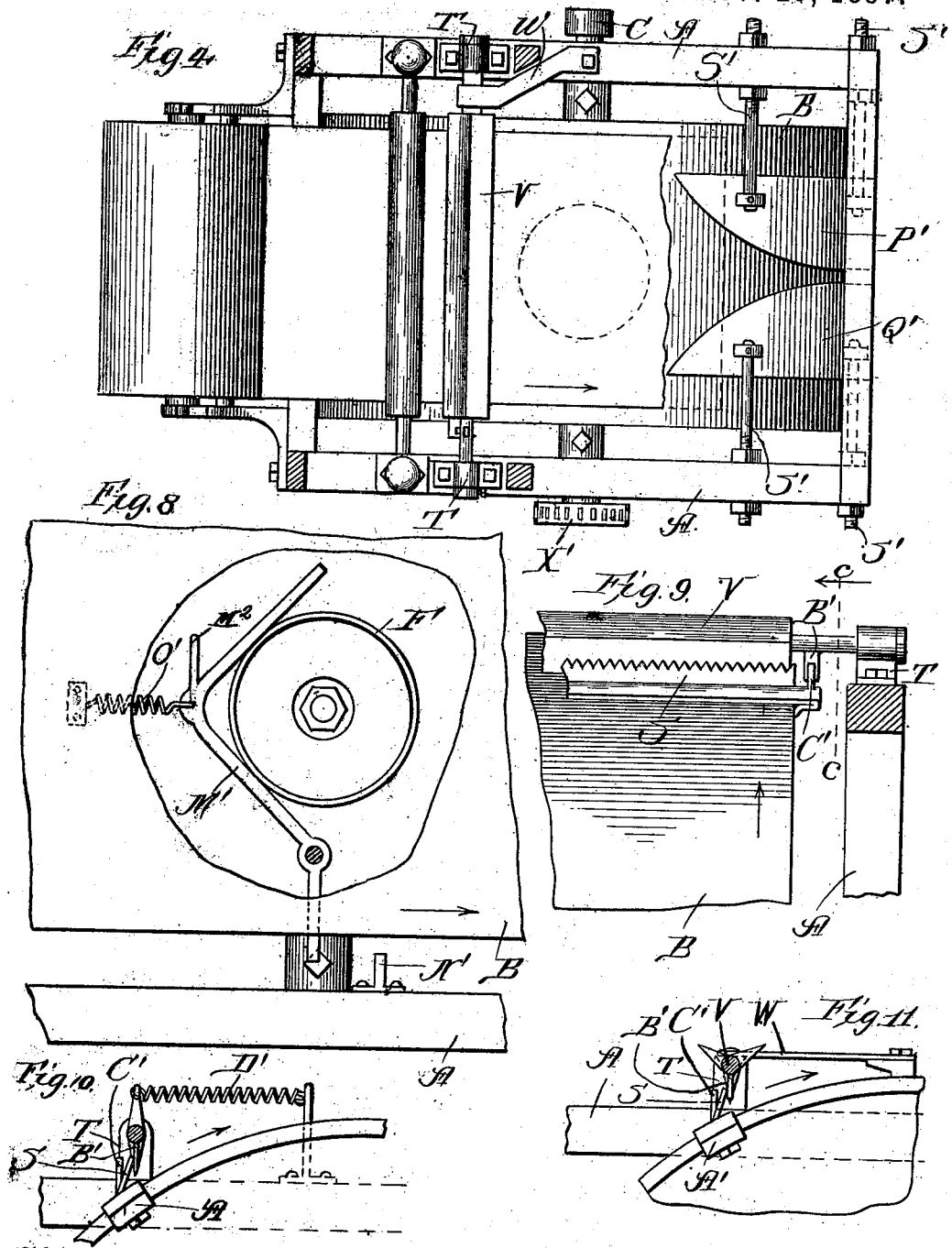

UNITED STATES PATENT OFFICE.

THOMAS E. NININGER, OF INTERLACHEN, FLORIDA, ASSIGNOR OF ONE-HALF TO CHARLES FRANCIS, JR., OF SAME PLACE, AND GEORGE F. FRANCIS, OF CHICAGO, ILLINOIS.

WRAPPING-MACHINE.

SPECIFICATION forming part of Letters Patent No. 594,273, dated November 23, 1897.

Application filed November 4, 1895. Serial No. 567,851. (No model.)

*To all whom it may concern:*

Be it known that I, THOMAS E. NININGER, a citizen of the United States, residing at Interlachen, in the county of Putnam and State of Florida, have invented a new and useful Wrapping-Machine, of which the following is a specification.

This invention relates to wrapping-machines.

The object of the invention is to improve the construction of machines of the class to which this invention relates and to provide an apparatus for wrapping various articles, such as fruit and other articles, in an effective and expeditious manner.

The invention consists, substantially, in the construction, combination, location, and relative arrangement of parts, all as will be more fully hereinafter set forth, as shown in the accompanying drawings, and finally pointed out in the appended claims.

In the following description and in the accompanying drawings I have shown an embodiment of my invention particularly adapted to wrapping oranges; but I do not desire to be limited or restricted thereto, as my invention is equally well adapted for wrapping other kinds of fruit or other articles.

Referring to the accompanying drawings and to the various views and reference-signs appearing thereon, Figure 1 is a view in side elevation of an apparatus embodying my invention. Fig. 2 is a vertical transverse sectional view of the same, taken on the line $y\ y$, Fig. 3. Fig. 3 is a vertical longitudinal sectional view taken on the line $x\ x$, Fig. 1. Fig. 4 is a sectional plan view taken on the line $b\ b$, Fig. 3. Fig. 5 is a detail view of the raceway-agitating eccentric, looking in the direction of arrow $z$, Fig. 3. Fig. 6 is a detail view in plan of the raceway and mechanism for delivering the article to be wrapped to the machine. Fig. 7 is a detail view of the raceway, in vertical transverse section, taken on the line $a\ a$, Fig. 2. Fig. 8 is a detail view, in broken plan, showing a form of means for folding the edges of the wrapping-paper over the article to be wrapped after said article is received in the machine and for preventing the neck of the wrapper from dragging back during the beginning of the twisting operation, the lever M' being shown in its retracted position. Fig. $8^a$ is a similar view showing the relative arrangement of the lever M' and contracting-plates P' Q' as the neck of the wrapper enters the space between said plates. Fig. 9 is a detail view, in broken elevation, showing a form of wrapper-severing cutter. Fig. 10 is a detail view in section showing a slight modification of the construction shown in Fig. 9, taken on the line $c\ c$ of said Fig. 9 and showing a means for operating the wrapper-severing cutter. Fig. 11 is a view similar to Fig. 10 of the construction shown in Fig. 9, which in many instances I prefer to use. Fig. 12 is a detail view showing a slightly-modified arrangement of the receptacles.

The same reference-sign is employed throughout the several views to designate the same part wherever it occurs.

In carrying out my invention I provide a suitable framework A of suitable size, material, and arrangement to support the several working parts, hereinafter to be more fully described.

Upon framework A, I mount in any suitable or convenient manner a traveling carrier adapted to receive the fruit or other article to be wrapped. In the particular form of apparatus shown, to which, however, I do not desire to be limited, this carrier comprises an open-ended cylindrical drum B, mounted upon to rotate with a shaft C, suitably journaled in the framework A. Mounted upon to travel with carrier B are the brackets D, forming bearings for shafts E, which carry receptacles F of a suitable form to receive and contain the article to be wrapped during the wrapping operation. Receptacles F are mounted upon to rotate with shafts E in the form of apparatus shown embodying the principles of my invention.

Upon each of the shafts E is mounted a gear G, and arranged in the path of travel of the carrier is an engaging plate H, suitably mounted and stationarily held upon the framework A and adapted to engage the gears G during a portion of the travel of the carrier, thereby effecting a rotation of shafts E. In the particular form of apparatus shown embodying my invention, and a form which I at present deem the best form for effecting the purposes had in view, to which, however, I do not desire to be limited, gear G is in the form of a friction-wheel, and is preferably formed with a peripheral groove adapted to receive a rubber tire J therein, and plate H is a friction-plate adapted to be engaged by the friction wheel or gear G during that part of the travel of said gear with carrier B which brings said gear adjacent to the location of said plate. By providing a rubber-tired frictional wheel a better frictional contact between said gear wheel or disk and plate is secured to more certainly and positively effect a rotation of the shaft E during this portion of its travel. It is evident, however, that the rubber tire may, if desired, be omitted or other forms of gearing may be employed and still fall within the scope of my invention.

Instead of mounting the brackets D upon the end wall of the drum and journaling therein the shafts E and removably mounting the receptacles F upon said shafts I may attach the brackets upon the inside of the periphery of the drum, as shown at $O^2$, Fig. 12, and form the receptacle with an integral extension arranged to be journaled in said bracket and mount the gear G upon such integral extension, as clearly shown in Fig. 12.

From the foregoing description it will be seen that as the carrier proceeds upon its travel or, in the form shown, as drum B rotates the gears upon shaft E are successively brought into engagement with plate H during a portion of its travel and a rapid rotary movement of the receptacles F is effected during this part of their travel. After the plate H is passed the rotation of shaft E, and consequently of the receptacle F carried thereby, is arrested by the friction due to the clamping-nut K, by which the receptacle is secured upon shaft E, pressing said receptacle against the bearing for said shaft, or this rotation may be arrested in any other suitable way, as merely by the friction of shaft E in its bearings, as will be evident. During a certain period of travel of receptacles F said receptacles are brought into position to receive the article to be wrapped, as will be hereinafter more fully described. In the particular form of apparatus shown, to which, however, I do not desire to be limited, the receptacles, their shafts, and the gearing are all located within the rotary drum, with the mouth of the receptacles presented toward the shell of the drum, said shell being suitably perforated opposite the mouth of each receptacle, as shown at L, in order to permit the article to be wrapped to be received in said receptacle.

I will now describe the mechanism for feeding the material forming the wrapper. The wrapper material, preferably in the form of a roll M, is suitably and conveniently supported in brackets N by the framework A in position for the web or sheet to be reeled of the same and fed to the machine, where it is severed into suitable lengths to form wrappers for the articles to be wrapped. If desired, a suitable base-roll O may be provided to support the roll M and form an initial guide for the sheet of wrapper material From roll O the sheet or web of wrapper material is fed to and between a pair of feed-rolls P Q, one or both of which may be, if desired, and preferably is positively driven. The top roll P of said feed-rolls may, if desired, be yieldingly held or pressed to engagement with its companion roll Q or the sheet of wrapping material in any suitable manner, as by spring or weight, as shown at R, by which a resilient pressure is imparted to said roll to enable an efficient grip and feeding action to be secured upon the sheet of wrapper material. The sheet of wrapper material is delivered from the feed-rolls P Q upon the traveling carrier and in position to be directly over the mouth of the receptacle F when said receptacle arrives in position to receive an article to be wrapped. In the particular form of apparatus shown the wrapping material is delivered upon the rotating drum in position to cover the perforation L therein when said perforation arrives in position for the article to be introduced.

The wrappers may be severed from the web or sheet of wrapper material by any suitably or conveniently arranged means. In the accompanying drawings I have shown means for accomplishing this result, to which, however, I do not desire to be limited, but which embodies the best form of mechanism in which I at present contemplate effecting this result, and wherein I mount upon the carrier B, adjacent to each receptacle and to the rear thereof with reference to the direction of its travel, a suitable knife S, and arrange the same to extend transverse with respect to the path of the movement of the carrier. The knife S may, if desired, be provided with a serrated cutting edge.

In suitable bearings T T upon the framework of the machine and arranged between the feed-rolls P Q and the path of travel of the carrier I journal a rotary ledger-blade V. This may consist, as shown most clearly in Figs. 2, 4, 9, and 11, of a blade having wings forming a triangle in cross-section. The ledger-blade is arranged in position for the sheet or web of wrapper material to pass between the same and the path of travel of the carrier. The wings of blade V are of a length to extend slightly below the path of travel of the cutters S. The rotary movement of ledger-blade V is yieldingly opposed in any suitable manner, as by means of a flat or leaf spring W, mounted upon the framework and arranged to bear upon a flat side of a triangular-shaped boss or hub formed on the ledger-blade, as clearly shown in Fig. 11. From the foregoing description it will be seen that as the carrier proceeds upon its travel the cutters S, mounted thereon, will be brought successively into engagement with a wing of the ledger-blade V, with the sheet or web of wrapper material interposed between the two. Preferably the cutting-knife is inclined forwardly, or in the direction of travel thereof, thereby pinching the sheet or web between the cutting edge of the knife and the flat surface of the wing of blade V. The forward travel of the cutter as it impinges against the blade V tends to rock or rotate the blade in the same direction in which the cutter moves. This tendency is opposed by the spring W, bearing upon the flat surface of the hub or boss on the axle of the blade V. When the movement of the knife in its travel effects a sufficient rocking of the blade V against the opposition of the spring to bring the next flat surface of the hub or boss upon which said spring bears into proper position for the spring to act thereon, the cutter will have effected a severing of the wrapper from the sheet or web, and the action of the spring passing the sharp corner of the hub or boss will cause the blade to quickly complete with a snap one-third revolution thereof in case of a triangularly-shaped blade, necessary to again bring the next blade into position to be engaged by the next succeeding knife, when the above operation will be repeated and another wrapper will be severed. The position of the knife S may be made adjustable, if desired, by means of the block A'. (See Figs. 10 and 11.)

If desired and in order to assist the knife in effecting a rocking or partial rotation of the ledger-blade, I may provide a suitable lug B' upon the axle of said blade and arrange the same to be engaged by a similar lug C' upon the knife S. (See Figs. 9, 10, and 11.)

In Fig. 10 I have shown a slightly-modified form of arrangement of ledger-blade wherein a winged blade is employed, and its rotary or rocking movement is opposed by an extension-spring D', which tends to return said blade to a normal position when said blade is rocked out of its normal position by the engagement thereof with the knife S or the engagement of lugs B' C'. In this form of my invention a complete rotation of the blade is not effected, as will be readily apparent.

The article to be wrapped may be introduced into the machine by hand, or, and preferably, in order to provide a complete automatic machine, any suitably-arranged mechanism for accomplishing this purpose mechanically and automatically may be provided. I have shown in the accompanying drawings a form of mechanism well adapted to the purpose, and which embodies the best form of mechanism in which I at present contemplate carrying out this idea; but I do not desire to be limited or restricted thereto.

I will now describe the construction shown for accomplishing the purpose stated, particular reference being had to Figs. 1, 2, 3, 5, 6, and 7, wherein reference-sign E' designates a suitable tray or raceway suitably supported upon the framework of the machine and adapted to receive the articles to be wrapped preliminary to being introduced singly into the machine. This raceway comprises, preferably, an inclined trough having the sides thereof converging toward each other, thereby forming a delivery end of a size and width adapted to permit the articles to be wrapped to pass singly therefrom, as clearly shown in Figs. 3 and 6.

In order that the oranges or other articles may be suitably agitated and fed down the raceway E', so as to be presented singly at the delivery end of said raceway, I arrange in the bottom or floor of the raceway E' a movable plate F'', adapted to be moved in any suitable manner, as by means of a rod G', connected thereto and reciprocated by means of an eccentric H' upon a suitably-driven shaft J', mounted in the framework of the machine.

In order to effectively assist the feed of the articles down the trough or raceway E', I impart to the plate F' a combined rising-and-falling and endwise-reciprocating movement. This may be accomplished in any suitable manner. In the particular form shown I provide the under surface of plate F' with notches adapted to receive the ends of links K', pivotally mounted upon the raceway E'. (See Fig. 2.) From the construction above described it will be seen that when the plate F' is reciprocated lengthwise by eccentric H' and rod G' it rises on its rearward movement and falls on its forward movement, thereby not only agitating the articles contained in the feed-trough, but also tending to feed them to the mouth of the trough.

Shaft J', above referred to, is journaled in suitable supporting standards or brackets rising from the framework and is arranged adjacent to and on a line transverse with the delivery-mouth of feed-trough E', as shown.

Mounted upon to rotate with shaft J are one or more suitable transferring and delivery fingers L', suitably shaped and adapted when shaft J' is rotated to receive the single article at the delivery end of the raceway and to deliver the same into the machine, the arrangement of the parts being such that the articles are delivered by the delivery-fingers L' into position to be received in the receptacle F, each revolution of shaft J' effecting a delivery of one article. It will also be observed that fingers L' are so shaped as to form a stop for the column of oranges or other articles in the raceway E' while said fingers are effecting a delivery of one of said articles, as will be readily understood by reference to the construction and arrangement illustrated in the drawings.

The operation of the several parts is so timed as to their joint and coöperative action as to deliver an article into a receptacle F when said receptacle is brought by its carrier into suitable and proper position to receive the same. At the same time a wrapper has been fed into position over the mouth of the receptacle F and has been severed from the sheet or web. While the parts are in this relative position the article to be wrapped is delivered into the receptacle, thereby carrying with it the wrapper, the edges of the wrapper being partially folded up around the edges of the receptacle by the center of said wrapper being carried down within the receptacle on account of the weight of the article, as will be readily understood.

In order that the projecting edges of the wrapper may be still further partially crimped before being subjected to the twisting apparatus, presently to be described, and in order to prevent the twisted neck of the wrapper from dragging back as it enters the twisting apparatus, I may, if desired, pivotally mount upon the carrier adjacent to the mouth of each receptacle F a lever M', one end arranged to project into position to be engaged by a lug N', formed on the framework adjacent to the point of delivery of the articles to be wrapped to the receptacles, (see Fig. 8,) and the other end of said lever suitably bent to extend around and in the rear of the mouth of said receptacle, as shown. A spring O' may be provided to oppose the action of lug N' upon said lever, and which tends to maintain said lever in normally-retracted position. The action of this lever when it is engaged by lug N' is to be moved or rocked forward over the mouth of the receptacle and well along between the converging plates P' Q' of the twisting apparatus, and by reason of its forked or V shape thereby effect a partial crimping of the projecting edges of the wrapper, as will be evident, and thus preventing the neck of the wrapper from dragging back until it is twisted. It will of course be understood that this preliminary crimper may, if desired, be altered in its details of construction, or it may be omitted entirely and still not affect the operation of the machine. Thus it will be seen that lever M' performs two functions. It preliminarily and partially crimps the neck of the wrapper as it projects above the top edges of the receptacle, and hence facilitates the introduction of such neck between the opposed converging edges of plates P' Q'. In addition to this function this lever is held projected forwardly by stop N' a sufficient period of time to prevent the neck of the wrapper from dragging back as it enters the space between the converging edges of said plates P' Q', thereby insuring a twisting thereof.

In order to avoid danger of the corner formed by the angle in lever M' at the point where spring O' is attached thereto catching against the top edge of the receptacle after said lever is released by stop N', I provide said lever with a finger M² at the angle thereof, which finger projects out over and rests upon the top edge of the receptacle at all times, thereby forming a supporting-guide for the lever.

In the practical operation of a wrapping-machine it is important to effect a twisting of the wrapper about the article in order to thoroughly and effectively accomplish the work and purpose in view. In order to effect this purpose, I arrange in the path of travel of the carrier B a pair of juxtaposited converging plates P' Q', (see more particularly Fig. 4,) arranged in position to receive therebetween the edges of the wrapper material as the receptacles are carried forward by said carrier, with the edges of the wrapper projecting beyond the mouth of the receptacle. The arrangement of parts is such that just as the projecting edges of the wrapper enter the space between the plates P' Q' the gear G upon the shaft of the receptacle carrying the wrapper engages the gear-plate H and begins to rotate the receptacle. This rotation continues as the constantly-decreasing space between the converging plates P' Q' is traversed by the projecting edges of the wrapper being carried forward by the traveling carrier. The effect of this combined rotation and forward travel of the receptacle between the converging plates is to cause the projecting edges of each wrapper to be contracted into a neck and effectively twisted about the article to be wrapped. By the time the entire length of gear-plate H has been traversed by the gear G upon the shaft of the receptacle the twisting of the wrapper has been completed, and the wrapped article may be discharged from the machine in any suitable way. In the particular form of mechanism shown embodying the principles of my invention the wrapped article is permitted to fall by gravity when the drum B has rotated to a position suitable for the article to fall out of the receptacle into any suitable receiving-trough, as R', from which it is removed and packed for shipping.

In order to facilitate the entrance of the edges of the wrapper as they project above the mouth of the receptacle into the space between plates P' Q', I may, if desired, and as shown, suitably curve the meeting edges of said plates, (see Fig. 4,) and the position of said plates may be suitably adjusted by means of bolts S', by which said plates are stationarily held and supported from the framework of the machine.

It will be evident that the traveling carrier B may be actuated by power or by hand in any suitable manner. I have shown as a merely illustrative embodiment of means for accomplishing the desired result a handcrank for effecting a rotation of shaft C; but I do not desire to be limited to any particular form or arrangement of driving means therefor. In similar manner the feed-roll Q and the shaft J' may be actuated and power-driven in any suitable manner.

I have shown a convenient arrangement of gearing whereby a proper timing in the operation of the several mechanisms may be easily secured, wherein I mount a gear U' upon one end of shaft C and connect the same by a suitable belt V' with similar gears W' X' on the feed-roll Q and shaft J', respectively. It is evident, however, that any other suitable arrangement of gearing for accomplishing the desired unison of action and proper actuation of the several parts may be employed without departing from the spirit or scope of my invention.

In some cases it may be desirable to provide a suitable raceway to receive the articles to be wrapped from the delivery-fingers L' and guide the same to the receptacles F as said receptacles are successively presented in proper position to receive the articles. I have shown in Fig. 2 a convenient form of guide, to which, however, I do not desire to be limited, and which consists of a basket-like arrangement comprising a ring $A^2$, suitably supported upon a convenient part of the framework and of a size adapted to permit the largest-sized articles to be wrapped to pass freely therethrough. Suitably supported by said ring and at suitable circumferential distances apart are two or more arms $B^2$, preferably in the form of flat springs, as shown, having their free ends arranged to converge and presented toward, adjacent to, and slightly above the path of travel of the receptacles F. A suitable band or ring $C^2$ is arranged to encircle the spring-arms $B^2$ and maintain the same in preferably a tube form. By adjusting the band or ring $C^2$ along the arms $B^2$ and then securing it in adjusted position the said tube or guide may be adjusted to accommodate different sizes of articles. It will be understood, of course, that the use of this guide may, if desired, be entirely dispensed with.

The operation of the machine is exceedingly simple and from the foregoing description will be readily and easily understood. The articles to be wrapped are placed in the trough or raceway E' and power is applied to the actuating-shaft C, the operation of which presents the receptacles successively in position to receive the articles to be wrapped singly therein, the wrapping material simultaneously therewith being fed over the mouth of the receptacle and severed from the sheet or web. The article is then introduced into the receptacle, thereby causing the edges of the wrapper to project beyond the mouth of the receptacle and to partially surround the article. Further travel of the receptacle carries the projecting edges of the wrapper between the meeting edges of the converging plates, and at the same time an axial rotation is imparted to the receptacles, thereby crimping the wrapper into a neck and twisting it tightly around the article. The complete wrapped article is then discharged from the machine, the above-described operation being repeated with each succeeding article. By effecting a continuous travel of the carrier a continuous operation is effected and the articles are very expeditiously wrapped and discharged from the machine.

I have shown carrier B provided with four receptacles, and consequently the relative speed of rotation of shafts C and J' should be four to one; but it is evident that the invention is not limited to any specific number of receptacles upon the carrier or relative speeds of rotation of the carrier-actuating and the delivery-finger-operating shafts.

While I have shown only a single carrier, it is evident that, if desired, the above-described several mechanisms may be duplicated or triplicated upon the same framework and operating-shafts.

Having now fully described the object and nature of my invention and a form of apparatus embodying the same and having explained the principle thereof and its mode of operation, what I claim as new, and desire to secure by Letters Patent of the United States, is—

1. In a wrapping-machine, a carrier, a receptacle, means for rotating the same, means arranged in the path of feed of said carrier adapted to engage and hold against rotation the edges of the wrapper and a lever mounted on said carrier and arranged adjacent to the receptacle and carrying an arm adapted to follow the neck of the wrapper while being twisted, as and for the purpose set forth.

2. In a wrapping-machine, a traveling carrier, a shaft mounted thereon, a receptacle carried by said shaft, means for feeding a wrapper over the mouth of said receptacle, means for depositing an article to be wrapped in said wrapper and receptacle, stationarily-held means arranged in the path of travel of said carrier and adapted to engage and confine the projecting edges of the wrapper, a gear-wheel mounted on said shaft and having a groove in the outer periphery thereof, a rubber tire mounted in said groove, a friction-plate arranged in the path of travel of said carrier and adapted to engage and actuate said carrier, whereby said shaft and receptacle are rotated; as and for the purpose set forth.

3. In a wrapping-machine, a traveling carrier, receptacles carried thereby adapted to receive a wrapper and the article to be wrapped, means for rotating said receptacles in combination with a gathering device mounted upon said carrier to travel therewith and arranged adjacent to said receptacle, and means for actuating the same, whereby the edges of the wrapper are gathered around the article, and stationarily-held means for engaging the gathered edges of the wrapper and holding the same against rotation during the rotation of the receptacles; as and for the purposes set forth.

4. In a wrapping-machine, a traveling carrier, a receptacle carried thereby and adapted to receive a wrapper and the article to be wrapped, means for rotating said receptacle, a lever mounted upon said carrier adjacent to said receptacle, and adapted when moved to gather the edges of the wrapper around the article, stationarily-held means for engaging the gathered edges of the wrapper and holding the same against rotation during the rotation of the receptacle; as set forth.

5. In a wrapping-machine, a traveling carrier, adapted to receive a wrapper and the article to be wrapped, means for rotating the article, a lever mounted on said carrier and adapted to be moved to gather the edges of the wrapper around said article, a spring for holding said lever in normally-retracted position, and stationarily-held means for holding the gathered edges of the wrapper during the rotation of the article; as set forth.

6. In a wrapping-machine, a cutting-blade, a coöperating ledger-blade, suitably journaled to rotate, and having a flat-sided boss on the shaft thereof, in combination with a spring arranged to bear on said boss and oppose the rotation of said blade; as set forth.

7. In a wrapping-machine, a cutting-blade, a coöperating rotarily-mounted ledger-blade, provided with wings and a flat-sided boss upon the shaft thereof, of a spring arranged to bear on said boss; as set forth.

8. In a wrapping-machine, wrapper-material-feeding mechanism, a traveling carrier, a holder mounted thereon adapted to receive a wrapper and the article to be wrapped, said carrier carrying a cutter, adapted to sever a wrapper, and means for adjusting said cutter with reference to said holder; as set forth.

9. In a wrapping-machine, wrapper-material-feeding mechanism, a traveling carrier, a holder mounted thereon adapted to receive a wrapper and the article to be wrapped and carrying a cutter, means for adjusting said cutter with reference to said holder, a ledger-blade arranged to project into the line of travel of the cutter, the line of feed of the wrapper material being between said ledger-blade and the path of travel of the cutter; as and for the purpose set forth.

10. In a wrapping-machine, a guide for the articles to be wrapped, comprising spring-arms and an adjustable ring or band arranged to encircle said arms, and means for securing said ring or band in adjusted position; as set forth.

11. In a wrapping-machine, a traveling carrier, receptacles carried thereby adapted to receive and rotate the articles to be wrapped, means for automatically depositing the articles to be wrapped in said receptacles, means for imparting rotation to said receptacles, and means arranged in the path of travel of said carrier for holding the edges of the wrapping material against rotation during the rotation of said articles; as and for the purpose set forth.

12. In a wrapping-machine, a carrier, a receptacle mounted therein adapted to receive a wrapper and the article to be wrapped, means for rotating said receptacle, means arranged in the path of travel of said receptacle, adapted to engage and hold the edges of the wrapper against rotation during the rotation of said receptacle, and means for preventing the twisted neck of the wrapper from dragging or lagging behind in said holding means; as and for the purpose set forth.

13. In a wrapping-machine, a traveling carrier, receptacles carried thereby, means for feeding the wrapper material thereto, means for automatically delivering the article to be wrapped to said receptacles, stationarily-held means arranged in the path of travel of said receptacles for contracting and holding the edges of the wrapper around the article, and means for rotating said receptacles; as and for the purpose set forth.

14. In a wrapping-machine, the combination of a traveling carrier, of receptacles mounted thereon, means for feeding the wrapping material over the mouth of said receptacles, means for depositing the articles to be wrapped in said receptacles and the wrapper material, whereby the articles are partially inclosed in the wrapper material, means arranged in the path of travel of the receptacles, adapted to contract and hold the projecting edges of the wrapper, and means for rotating said receptacles; as and for the purpose set forth.

15. In a wrapping-machine, a traveling carrier, receptacles carried thereby, means for feeding the wrapping material over the mouth of said receptacles, means for automatically dropping the articles to be wrapped in said wrapping material and receptacles, whereby the articles are partially inclosed in said wrapping material, means arranged in the path of travel of the receptacles for contracting and holding the projecting edges of the wrapper material, and means for axially rotating said receptacles; as and for the purpose set forth.

16. In a wrapping-machine, a traveling carrier, receptacles carried thereby, means for feeding the wrapping material over the mouth of said receptacles, means for delivering the articles to be wrapped into the wrapper and receptacle, whereby the articles are partially inclosed in said wrapping material, means arranged in the path of travel of the receptacle for imparting an axial rotation thereto during only a portion of the travel thereof, and means also arranged in the path of travel of the receptacle, adapted to engage, contract and hold the projecting edges of the wrapper during the rotation of said receptacle; as and for the purpose set forth.

17. In a wrapping-machine, a traveling carrier, receptacles carried thereby, means for rotating said receptacles, and means for first presenting the wrapper material to said receptacles and then introducing the article to be wrapped therein, whereby the articles are partially inclosed in the wrapper in combination with stationarily-held means for contracting and confining the projecting edges of the wrapper during the rotation of said receptacles; as and for the purpose set forth.

18. In a wrapping-machine, a rotary drum, receptacles rotarily mounted therein, means for automatically delivering, first, the wrapping material, and then the article to be wrapped in said receptacles, whereby the articles are partially inclosed in said wrapping material, and stationarily-held means for confining the projecting edges of the wrapper, and means for rotating said receptacle; as and for the purpose set forth.

19. In a wrapping-machine, a rotary drum, receptacles rotarily mounted therein, means for automatically delivering, first, the wrapping material and then the articles to be wrapped to said receptacles, whereby the articles are partially inclosed in said wrapping material, and stationarily-held means arranged in the path of travel of said receptacles adapted to receive, confine and contract the projecting edges of the wrapper and means for rotating said receptacles; as and for the purpose set forth.

20. In a wrapping-machine, a traveling carrier, a shaft mounted thereon and carrying a receptacle, means for feeding first the wrapping material and then the article to be wrapped to said receptacle, means arranged in the path of travel of said carrier for engaging, confining and contracting the projecting edges of the wrapping material, and means for rotating said shaft; as and for the purpose set forth.

21. In a wrapping-machine, a traveling carrier, a shaft mounted thereon and carrying a receptacle, means for feeding, first the wrapping material and then the article to be wrapped in said receptacle, whereby the article is partially inclosed in the wrapping material, means arranged in the path of travel of the carrier, arranged to engage and confine the projecting edges of the wrapper, a gear mounted on said shaft, and means for engaging said gear during the travel of said carrier, whereby said shaft and receptacle are rotated and the wrapper is twisted about the article; as and for the purpose set forth.

22. In a wrapping-machine, a traveling carrier, a shaft mounted thereon and carrying a receptacle, means for feeding first the wrapping material and then the article to be wrapped to said receptacle, whereby the article is partially inclosed in the wrapping material, means arranged in the path of travel of the carrier, arranged to engage and confine the projecting edges of the wrapper, a gear mounted on said shaft, a gear-plate arranged in the path of movement of said gear, and adapted to engage and rotate said gear, whereby said shaft and receptacle are rotated and the wrapper twisted about the article; as and for the purpose set forth.

23. In a wrapping-machine, a traveling carrier, a shaft mounted thereon and carrying a receptacle, means for feeding the wrapper material and the article to be wrapped to said receptacle, whereby the article is partially inclosed in the wrapper, stationarily-held means for engaging and confining the projecting edges of the wrapper, a friction-gear mounted on said shaft, a friction-plate arranged in the path of travel of said friction-gear and adapted to engage and actuate said gear, whereby said shaft and receptacle are rotated while the projecting edges of the wrapper are confined, thereby twisting the wrapper about the article; as and for the purpose set forth.

24. In a wrapping-machine, a traveling carrier, receptacles carried thereby, means for delivering first the wrapper material and then the article to be wrapped to said receptacles, whereby the articles are partially inclosed in said receptacles, in combination with stationarily-held plates, arranged adjacent to the line of travel of said receptacles and adapted to receive and hold the projecting edges of the wrapper between them, and means for rotating said receptacles, whereby the wrapper is twisted about the articles during the rotation of the receptacles; as and for the purpose set forth.

25. In a wrapping-machine, a traveling carrier, rotatable receptacles carried thereby, means for automatically delivering, first, the wrapper material and then the articles to be wrapped to said receptacles, whereby the articles are partially inclosed in said wrappers, in combination with stationarily-held plates, having their meeting edges arranged in the path of travel of said receptacles and adapted to receive between their meeting edges the projecting ends of the wrapper, and means for rotating said receptacles, whereby the wrapper is twisted about the article during the rotation of said receptacle; as and for the purpose set forth.

26. In a wrapping-machine, a traveling carrier, rotatable receptacles carried thereby, means for automatically delivering first the wrapper material and then the articles to be wrapped to said receptacles, whereby the articles are partially inclosed in said wrappers, in combination with stationarily-held plates having curved meeting edges, said edges converging toward each other and arranged in the line of travel of the carrier and adapted to receive therebetween the projecting edges of the wrapper, and means for rotating said receptacles, whereby the wrapper is twisted about the articles; as and for the purpose set forth.

27. In a wrapping-machine, a traveling carrier, rotatable receptacles carried thereby, means for automatically delivering, first, the wrapper, and then the articles to be wrapped to said receptacles, whereby the articles are partially inclosed in the wrapper, in combination with stationarily-held juxtaposited plates arranged in the path of travel of said receptacles and adapted to receive therebetween their meeting edges the projecting edges of the wrapper, means for relatively adjusting the position of said plates and means for rotating the receptacles while the edges of the wrapper are confined between said plates, whereby the wrapper is twisted about the articles to be wrapped; as and for the purpose set forth.

28. In a wrapping-machine, a traveling carrier, receptacles carried thereby, means for automatically feeding first the wrapper and then the article to be wrapped to said receptacles, in combination with means for contracting the projecting edges of the wrapper around the article, stationarily-held means arranged in the path of travel of the receptacles, adapted to receive and confine the contracted edges of the wrapper, and means for rotating the receptacles while the wrapper is twisted about the articles; as and for the purpose set forth.

29. In a wrapping-machine, a traveling carrier, means for feeding thereto, first, the wrapper, and then the article to be wrapped, means mounted on said carrier for contracting the edge of the wrapper about the article, stationarily-held means arranged in the path of travel of the carrier, adapted to receive and hold the contracted edges of the wrapper, and means for rotating the article while the wrapper is so held; as and for the purpose set forth.

30. In a wrapping-machine, a traveling carrier, means for feeding the wrapper material to said carrier in a sheet or web, a cutter carried by said carrier, means for actuating said carrier, a stationarily-held ledger-blade against which said cutter operates to sever a wrapper from said sheet or web, means for feeding the article to be wrapped to said carrier, and means for twisting the wrapper about the article; as and for the purpose set forth.

31. In a wrapping-machine, a traveling carrier, receptacles carried thereby, means for feeding first a wrapper and then the articles to be wrapped to said receptacles, whereby the articles are partially inclosed in the wrapper, stationarily-held means arranged in the path of travel of the receptacles adapted to receive and confine the projecting edges of the wrapper, means for rotating said receptacles while the wrapper edges are confined, and a receiving-trough arranged to receive the wrapped articles from said receptacles; as and for the purpose set forth.

32. In a wrapping-machine, a traveling carrier, means for feeding the wrapper material thereto, a cutter mounted on said carrier, a coöperating ledger-blade stationarily held and means for rotating the article to be wrapped; as and for the purpose set forth.

33. In a wrapping-machine, a traveling carrier, a cutter carried thereby, means for feeding the wrapper material to said carrier, a rotarily-mounted ledger-blade stationarily held adjacent to the path of travel of the carrier, means for delivering the article to be wrapped to said carrier, and means for twisting the severed wrapper about the article; as and for the purpose set forth.

34. In a wrapping-machine, a traveling carrier, a cutter carried thereby, means for feeding the wrapper material to said carrier, a ledger-blade journaled in stationary bearings adjacent to the path of feed of the wrapper material with which said cutter coöperates to sever a wrapper from said material, means for resisting the rotary movement of said ledger-blade, means for delivering the articles to be wrapped to said carrier, and means for twisting the severed wrapper about the articles; as and for the purpose set forth.

35. In a wrapping-machine, a traveling carrier, a cutter carried thereby, a ledger-blade journaled in stationary bearings adjacent to the path of movement of said cutter and arranged to coöperate therewith to sever a wrapper from the wrapper material, a spring arranged to hold said ledger-blade yieldingly against rotation, means for delivering the article to be wrapped to said carrier, and means for twisting the severed wrapper about the article; as and for the purpose set forth.

36. In a wrapping-machine, a traveling carrier, adapted to receive the wrapping material and the articles to be wrapped, a cutter mounted on said carrier, a ledger-blade rotarily mounted adjacent to the path of travel of said carrier and coöperating with said cutter to sever a wrapper from the wrapper material, said ledger-blade provided with a lug arranged to be engaged by said carrier, and means for twisting the severed wrapper about the article; as and for the purpose set forth.

37. In a wrapping-machine, a traveling carrier, means for feeding the wrapper material and the article to be wrapped to said carrier, a cutter mounted on said carrier, a ledger-blade rotarily mounted adjacent to the path of travel of the carrier and having a lug arranged to be engaged by the carrier, a spring arranged to yieldingly resist the rotary movement of the carrier, and means for twisting the severed wrappers about the article; as and for the purpose set forth 38. In a wrapping-machine, and in combination with rotary receptacles and means for feeding the wrapper material thereto, of a delivery-trough for the articles, provided with a movable bottom, and means for reciprocating the same in the direction of the length thereof, and means for confining the edges of the wrapper material during the rotation of the said receptacles; as and for the purpose set forth.

39. In a wrapping-machine, a carrier, receptacles carried thereby, a feed-trough having a movable part in the bottom thereof, arms pivotally mounted at one end in said trough and engaging at the opposite end with said movable part, and means for longitudinally reciprocating said movable part, whereby a rising-and-falling and longitudinal movement is imparted to said movable part; as and for the purpose set forth.

40. In a wrapping-machine, a drum, having perforations through the shell thereof, means for rotating said drum, receptacles mounted within said drum and having the mouths thereof arranged to register with said perforations, means for delivering the articles to said receptacles, through said perforations, whereby the articles are partially inclosed in the wrappers, means for rotating said receptacles, and means arranged in the path of travel of the receptacles adapted to confine the projecting edges of the wrapper during the rotation of said receptacles; as and for the purpose set forth.

41. In a wrapping-machine, a traveling carrier, an actuating-shaft therefor, comprising the main drive-shaft of the machine, means for delivering the articles to be wrapped to said carrier, including a driving-shaft, means for feeding the wrapper material to said carrier, including feed-rolls, gears mounted on said rolls and shaft, a drive-belt arranged to engage all of said gears whereby they are all simultaneously driven, and stationarily-held means, arranged in the path of travel of the carrier adapted to engage and confine the edges of the wrapping material, and means for rotating the article to be wrapped; as and for the purpose set forth.

In witness whereof I have hereunto set my hand this 5th day of August, 1895.

THOMAS E. NININGER.

Attest:
  C. L. WHIPP,
  O. S. WHIPP.